US012803252B2

(12) United States Patent
Adams

(10) Patent No.: US 12,803,252 B2
(45) Date of Patent: Nov. 17, 2026

(54) PULL LINE SYSTEMS

(71) Applicant: The ADT Security Corporation, Boca Raton, FL (US)

(72) Inventor: Benjamin Amos Adams, Bristol, VA (US)

(73) Assignee: The ADT Security Corporation, Boca Raton, FL (US)

( * ) Notice: Subject to any disclaimer, the term of this patent is extended or adjusted under 35 U.S.C. 154(b) by 623 days.

(21) Appl. No.: 18/481,004

(22) Filed: Oct. 4, 2023

(65) Prior Publication Data

US 2025/0118950 A1 Apr. 10, 2025

(51) Int. Cl.
*H02G 1/08* (2006.01)

(52) U.S. Cl.
CPC .................................... *H02G 1/081* (2013.01)

(58) Field of Classification Search
CPC ........ H02G 1/081; H02G 1/083; H02G 1/086; H02G 3/286; Y10T 29/49195; Y10T 29/532
See application file for complete search history.

(56) References Cited

U.S. PATENT DOCUMENTS 4,043,537 A * 8/1977 Russo, Jr. .............. H02G 1/086 254/134.4
5,738,433 A 4/1998 Sparks
7,093,822 B2 8/2006 Welker
7,150,448 B1 12/2006 Swift
9,062,834 B2 * 6/2015 Rennecker ............. H02G 1/083
10,473,277 B1 11/2019 Newsome
11,557,889 B2 * 1/2023 Kaleshnik .............. H02G 3/286

FOREIGN PATENT DOCUMENTS

WO WO-2024253566 A1 * 12/2024 ......... B65H 75/4402

OTHER PUBLICATIONS

Super Rod Series Fish Rod Sets The perfect choice for routing cable; Klein Tools Brochure; May 2017; Lincolnshire, IL, consisting of 2-pages.

* cited by examiner

*Primary Examiner* — Donghai D Nguyen
(74) *Attorney, Agent, or Firm* — Weisberg I.P. Law, P.A.

(57) ABSTRACT

A system is provided. The system comprises a pull line that is magnetically removably attachable to an elongated body and electrically conductive. The an elongated body comprises an electroluminescent source disposed along the elongated body and configured to emit photons when electrical power is applied between a core conductor and at least one of a first outer conductor and the second outer conductor. The elongated body comprises a first portion comprising at least one electrical power source in electrical communication with the core conductor and the first outer conductor. The second portion comprises a plurality of magnets where a first magnet and the second magnet are removably attachable, by magnetic coupling, to the pull line to activate portions of the electroluminescent source that are proximate the first and the second outer conductors.

20 Claims, 10 Drawing Sheets

PULL LINE SYSTEMS

TECHNICAL FIELD

The present technology is generally related to pull line systems.

BACKGROUND

Some wire fishing tools may be used to assist a user in routing wires through various portions of a premises that may not be readily accessible. For example, some fishing wire tools may route wires behind a wall and/or through spaces having minimal access.

BRIEF DESCRIPTION OF THE DRAWINGS

A more complete understanding of the present disclosure, and the attendant advantages and features thereof, will be more readily understood by reference to the following detailed description when considered in conjunction with the accompanying drawings wherein.

DETAILED DESCRIPTION

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. The terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. Multiple components may interoperate and modifications and variations are possible to achieve the electrical and data communication.

In some embodiments described herein, the term "coupled," "connected," and the like, may be used herein to indicate a connection, although not necessarily directly, and may include wired, magnetic and/or wireless connections.

Figure 1:
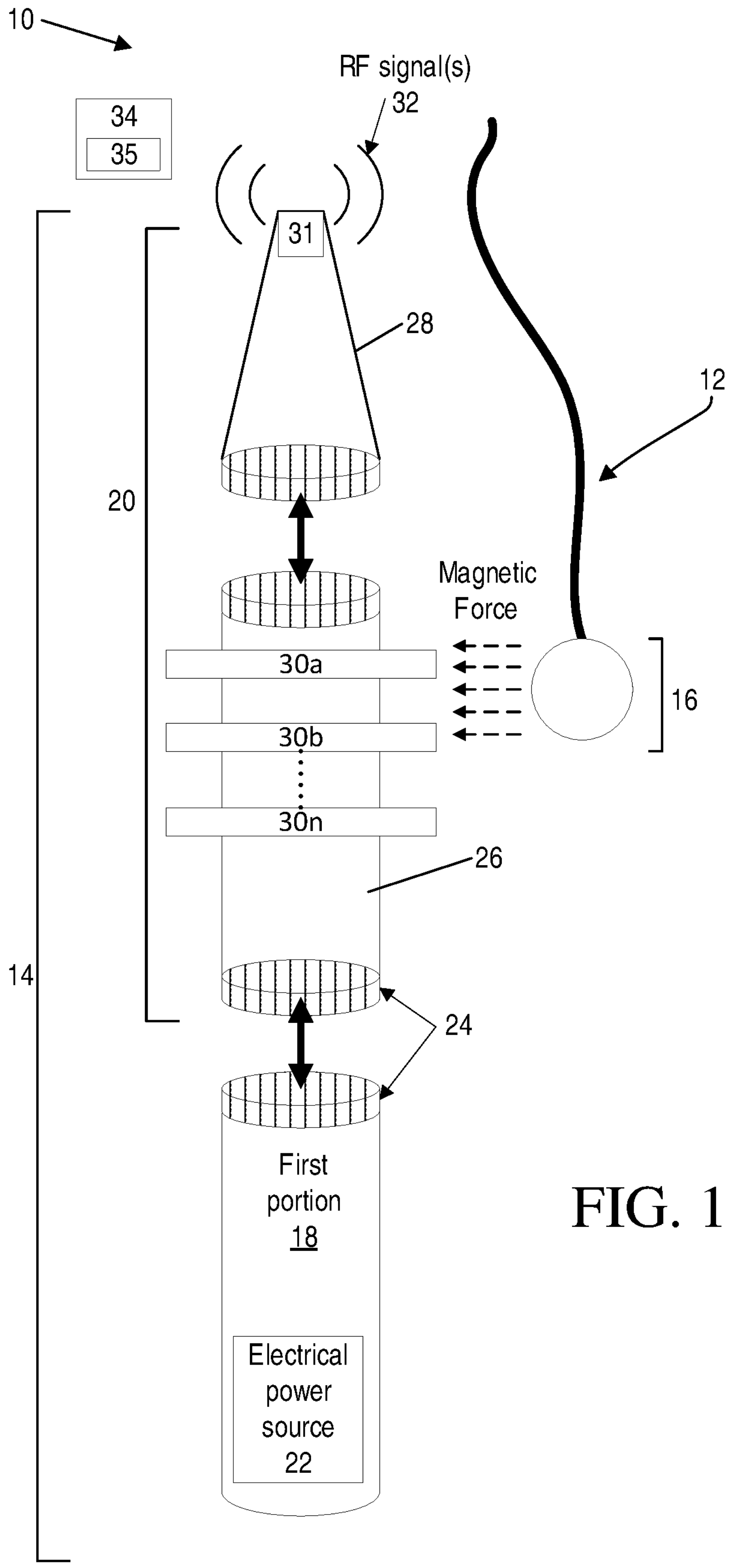
FIG. 1 is a diagram of an example system according to some embodiments of the present disclosure.

Referring to the drawing figures, in which like elements are referred to by like reference numerals, there is shown in FIG. 1 a diagram of an example system 10 according to various embodiments of the present disclosure. The system 10 may include pull line 12 and elongated body 14, and the elongated body 14 may be used to retrieve and/or "fish" for pull line 12. Pull line 12 may comprise a line portion that may be removably attached to an engageable element 16. The line portion may comprise one or more types of lines, such as one or more of wire, chain, rope, thread, cord, among other types of materials that may be attached or removably attached to engageable element 16.

Engageable element 16 may be removably attachable to elongated body and may be electrically conductive. For example, engageable element 16 may be composed of an electrically conductive material, such as metal that may allow engageable element 16 to be in electrical communication with one or more elements in system 10, as described herein. Further, the electrically conductive material of engageable element 16 may be magnetically attractable, thereby allowing elongated body 14 to attract and removably attach to engageable element 16 and optionally to the line portion of pull line 12.

In one or more embodiments, engageable element 16 has a length, width or diameter greater than or equal to a distance between at least two magnets, as described below. Engageable element 16 may be ring-shaped structure to facilitate engageable element 16 being "hooked" by elongated body 14. In one or more embodiments, engageable element 16 may be rod-shaped structure, a circular-shaped structure, a drop-shaped structure, a triangular-shaped structure, a rectangular-shaped structure, a hook-shaped structure, etc. In one or more embodiments, pull line 12 comprises a conductive wire, chain, rope, thread, cord, or string, and the engageable element 16 is a magnetic portion of the conductive wire, chain, rope, thread, cord, or string. Engageable element 16 may be formed by one or more other shapes in accordance with the teachings described herein.

Referring now to elongated body 14 of FIG. 1, elongated body 14 comprises a first portion 18 that is removably connectable to a second portion 20 of elongated body 14. First portion 18 includes electrical power source 22 that is configured to provide power to one or more elements and/or components system 10 and/or elongated body 14. First portion 18 may further comprise mating element 24 that is removably connectable and/or removably mateable with another mating element 24. For example, first portion 18 may be removably mateable with second portion 20 via another mating element 24 at one end of second portion 20. In one or more embodiments, mating element 24 of first portion 18 may be a first type of mating element, such as one of a female or male type coaxial connector, while the other mating element 24 of second portion 20 may be a second type of mating element, such as a male or female type coaxial connector different from the first type. While a coaxial connector is used as an example, the present disclosure is equally applicable to other connector types such as connectors that provide an electrical path among one or more conductors.

Second portion 20 of elongated body 14 may comprise retaining portion 26 and an optional capture portion 28 that may include a capture component. Retaining portion 26 may include one or more mating elements 24 described above for removably mating with first portion and/or capture portion 28. Retaining portion 26 may comprise a plurality of magnets 30*a*-30*n* (collectively or separately referred to as magnet 30). Each magnet 30 may be fixed or removably fixed to retaining portion 26. Each magnet 30 is spaced apart from the other magnets 30, and the spacing between magnets 30 may be the same or substantially the same. Alternatively, the spacing between magnets may be varied. Further, magnet 30 may be sized and/or positioned on retaining portion 26 based, for example, the size of engageable element 16 such as to allow retaining portion 26 to removably retain engageable element 16 while also retaining engageable element 16 in a manner that will close an electrical circuit as described herein. Magnet 30 produces a magnetic field for pulling or attracting, for example, ferromagnetic materials, such as engageable element 16. Further, in one or more embodiments, magnet 30 may be electrically conductive, thereby allowing one or more magnets 30 to be part of an electrical circuit, as described herein.

Capture portion 28 of second portion 20 may include mating element 24 for removably mating to one end of retaining portion 26. Capture portion 28 may removably capture at least a portion of pull line 12. In one or more embodiments, capture component of capture portion 28 comprises a hook, such as a spiral-shaped hook, a corkscrew-shaped hook or another type of hook. In one or more embodiments, capture component may be a magnetic rod-shaped structure that may removably capture at least a portion of pull line 12. In one or more embodiments, capture component is a structure that extends away from second portion 20 that is configured to removably capture at least a portion of pull line 12 via one or more of applied force or magnetic force.

Further, in one or more embodiments, capture portion 28 may comprise one or more radio frequency (RF) transmitters 31 (collectively and/or separately referred to as RF transmitter 31) in electrical communication with electrical power source 22. RF transmitter 31 may be configured to emit one or more frequencies (i.e., emit one or more RF signals 32 at one or more frequencies), and each frequency may be configured to be detectable at a different distance from the RF transmitter 31. In one example, one or more RF transmitters 31 may emit three different shortwave frequencies. A first shortwave frequency is configured to be detectable within a first distance (e.g., 10-15 feet) from RF transmitter 31. For example, the first shortwave frequency may be configured with a predefined power and/or frequency such as to allow for the detection of the first shortwave frequency within a predefined distance. A second shortwave frequency is configured to be detectable within a second distance (e.g., 5 feet) from RF transmitter 31, and a third shortwave frequency is configured to be detectable within a third distance (e.g., 6 inches) from RF transmitter 31. While RF transmitter 31 is illustrated as being part of capture portion 28, in one or more embodiments, RF transmitter 31 may be part of retaining portion 26 and/or first portion 18.

System 10 may further comprise RF detector 34 that is configured to detect one or more RF signals emitted from RF transmitter 31. For example, RF detector 34 may be configured to detect the one or more RF signals at different distances from RF transmitter 31 to, for example, allow a user to locate RF transmitter 31 (i.e., locate elongated body 14). In particular, RF detector 34 may include hardware. The hardware may include processing circuitry 35. The processing circuitry 35 may include a processor and a memory. In addition to or instead of a processor, the processing circuitry may comprise integrated circuitry for processing and/or control, e.g., one or more processors and/or processor cores, field programmable gate arrays (FPGAs), and/or application specific integrated circuits (ASICs) adapted to execute instructions. The processor may be configured to access (e.g., write to and/or read from) the memory, which may comprise any kind of volatile and/or nonvolatile memory, e.g., cache, buffer memory, random access memory (RAM), read-only memory (ROM), optical memory, and/or erasable programmable read-only memory (EPROM). Further, memory may be configured as a storage device. The processing circuitry may be configured to perform various functionality described herein. For example, computer instructions may be stored in memory and/or another computer-readable medium that, when executed by the processor, cause the processor to perform various functionality.

Hardware of RF detector 34 may include a communication interface enabling RF detector 34 to communicate with any component or device of system 10. The communication interface may be formed as or may include, for example, one or more RF transmitters, one or more RF receivers, and/or one or more RF transceivers.

RF detector 34 further has software stored internally in, for example, memory, or stored in external memory (e.g., database, storage array, network storage device, etc.) accessible by the RF detector via an external connection. Software may include any software or program configured to perform the steps or processes of the present disclosure, e.g., detecting RF signals and triggering one or more actions.

The processing circuitry 35 may be configured to control any of methods and/or processes described herein and/or to cause such methods, and/or processes to be performed, e.g., by RF detector 34. Processor corresponds to one or more processors for performing RF detector 34 functions described herein. The memory is configured to store data and/or files. In some embodiments, the software may include instructions that, when executed by the processor and/or processing circuitry 35, causes the processor and/or processing circuitry 35 to perform the processes described herein with respect to RF detector 34.

RF detector 34 may be configured to trigger a respective alert for each of the detected frequencies. For example, RF detector 34 may be configured to trigger a first alert based on a detected first frequency, in which the first alert comprises at least one of haptic feedback, audible feedback or visual feedback, trigger a second alert based on a detected second frequency, in which the second alert comprises at least one of haptic feedback, audible feedback or visual feedback, and trigger a third alert based on the detected third frequency, in which the third alert comprises at least one of haptic feedback, audible feedback or visual feedback. The first, second and third frequencies being different frequencies, and the first, second and third alerts being different alerts.

Figure 2:
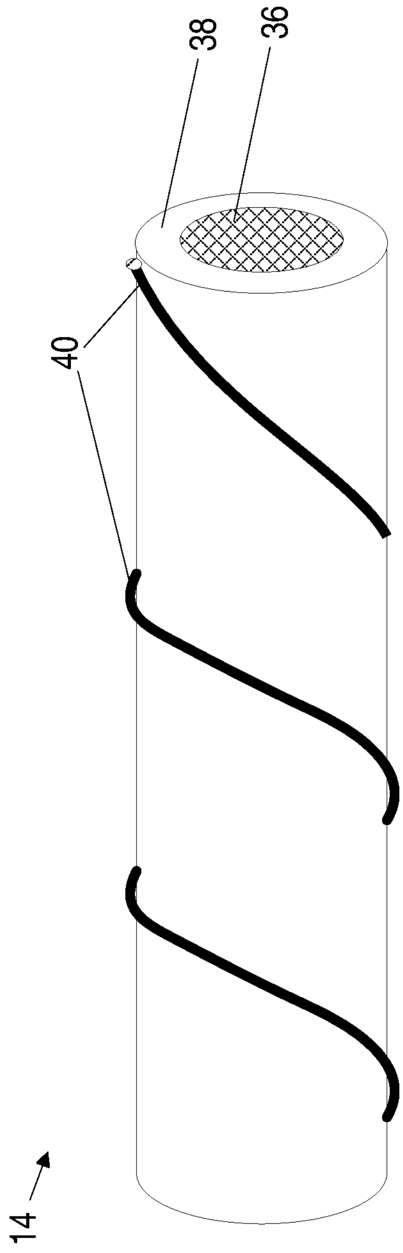
FIG. 2 is a diagram of an example portion of an elongated body in the system of FIG. 1 according to some embodiments of the present disclosure.

FIG. 2 is a perspective view of a cross-section portion of elongated body 14 of the system of FIG. 1 according to some embodiments of the present disclosure. In one or more embodiments, elongated body 14 comprises core conductor 36, material 38 and one or more outer conductors 40 (collectively and/or separately referred to as outer conductor 40). In particular, core conductor 36 is in physical contact with material 38, while material 38 may be in physical contact with outer conductor 40. In one or more embodiments, material 38 may electrically isolate core conductor 36 from outer conductor 40.

Elongated body 14 may be configured to emit photons when electrical power is applied between the core conductor 36 and the outer conductor 40. For example, electrical power source 22 may be in electrical communication with core conductor 36 and outer conductor 40 such as to provide electrical power between core conductor 36 and outer conductor 40, which causes material 38 to emit photons. In one or more embodiments, the electrical power provided may be Alternating Current (AC) power. Material 38 may be an electroluminescent material comprising, for example, phosphor material that is electrically activatable to emit light or photons. While outer conductor 40 is illustrated in a wrapping-around configuration in FIG. 2, other physical arrangements of outer conductor 40 are equally applicable in accordance with the teachings described herein. Further, one or more sleeves may be used to protect elongated body 14.

Figure 3:
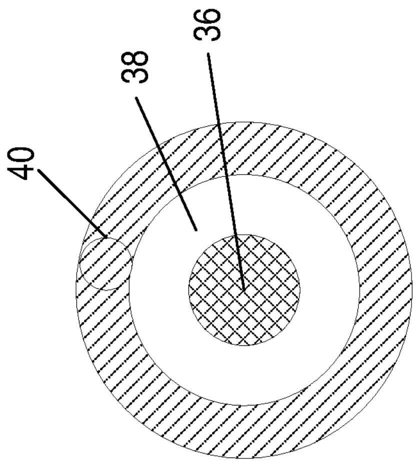
FIG. 3 is a diagram of an example of a cross-sectional area of the elongated body in the system of FIG. 1 according to some embodiments of the present disclosure.

FIG. 3 is a side view of a cross-section portion of elongated body 14 of the system of FIG. 1 according to some embodiments of the present disclosure.

Figure 4:
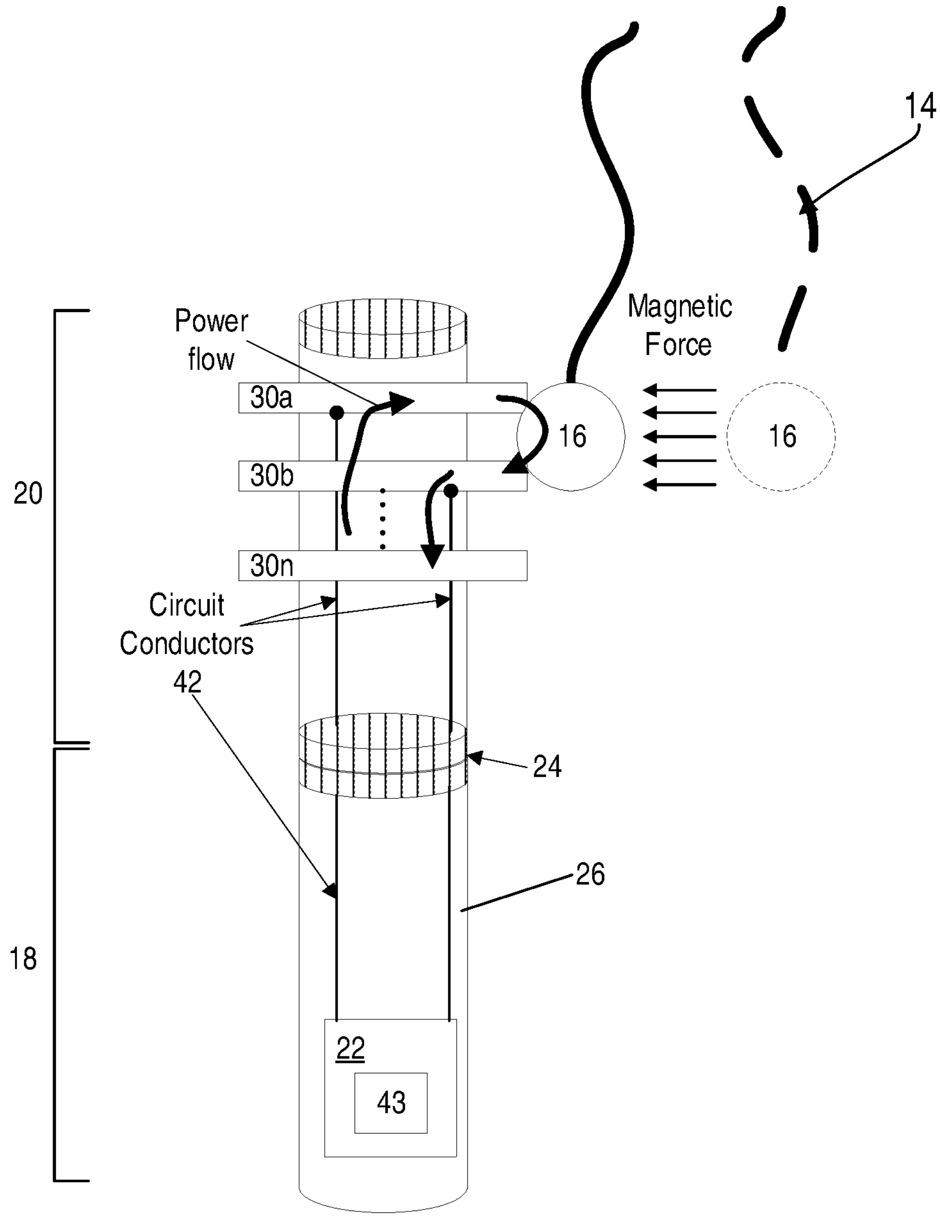
FIG. 4 is a diagram of another example of a portion of the elongated body and the pull line in the system of FIG. 1 according to some embodiments of the present disclosure.

FIG. 4 is a diagram of first portion 18 and second portion 20 of elongated body 14 of FIG. 1 according to some embodiments of the present disclosure. In particular, one or more circuit conductors 42 (collectively and/or separately referred to as circuit conductor 42) are disposed along elongated body 14. For example, circuit conductors 42 may provide, in part, one or more electronic paths from electrical power source 22 to one or more magnets 30, thereby creating an electrical circuit. That is, an electrical circuit may be provided, by elongated body 14, to and from electrical power source 22 via circuit conductors 42, mating elements 24, and magnets 30. However, the electrical circuit is configured to have an electrical discontinuity between at least two magnets 30.

Figure 5:
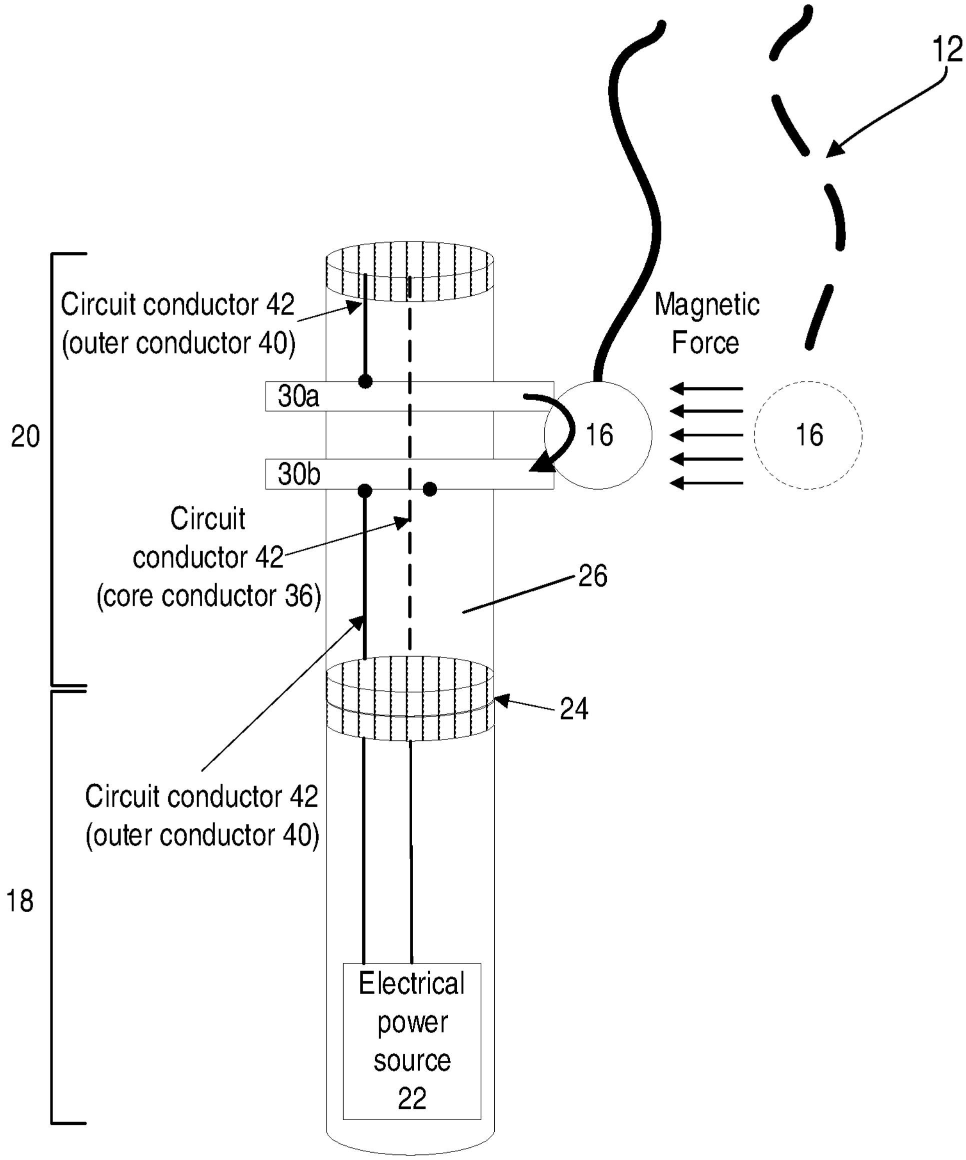
FIG. 5 is a diagram of another example of a portion of the elongated body and the pull line in the system of FIG. 1 according to some embodiments of the present disclosure.

In the example of FIG. 4, the electrical discontinuity in the circuit is configured between magnet 30*a* and magnet 30*b*, and the engageable element 16 is configured to electrically connect magnet 30*a* and magnet 30*b*, thereby allowing power to flow through the electrical circuit. That is, magnet 30*a* and magnet 30*b* are not preconfigured to be electrically connected to each other. Further, more than one circuit may be provided such as, for example, one circuit including an electrical discontinuity between magnets 26*a* and 26*b* (as shown in FIG. 5) and another circuit using different circuit conductors 42, and an electrical discontinuity is provided between two other magnets 30. In this example, when the electrical circuit is complete, trigger circuit 43 may cause electrical power source 22 to power core conductor 36 and outer conductor 40 to electrically activate material 38 to emit photons. In one or more embodiments, trigger circuit 43 may cause an indicator element in first portion 18 to activate when the electrical circuit is complete. The indicator element may provide one or more of visual feedback, audible feedback or haptic feedback. In one or more embodiments, trigger circuit 43 is configured to trigger the indicator and/or power between core conductor 36 and outer conductor 40 based on detecting power flow (e.g. DC power flow) through the electrical circuit.

FIG. 5 is a diagram of another example of first portion 18 and second portion 20 of elongated body 14 of FIG. 1 according to some embodiments of the present disclosure. In one or more embodiments, the circuit conductors 42 may correspond to core conductor 36 and outer conductor 40 such that core conductor 36 and outer conductor 40 are configured to provide power to activate material 38. In the example of FIG. 5, at least a portion of each of the core conductor 36 and the outer conductor 40 of the retaining portion 26 of second portion 20 is configured to extend from magnet 30*a* in a direction opposite the first portion 18 and magnet 30*b*.

That is, material 38 may be an electroluminescent material that is activated to emit photons when electrical power is provided between core conductor 36 and outer conductor 40. In the example of FIG. 5, the portion of elongated body 14 from first portion 18 to magnet 30*b* will be activated by power flowing through core conductor 36 and through a portion of outer conductor 40. However, magnet 30*a* and magnet 30*b* are configured with a discontinuity in the outer conductor 40 such that the portion of outer conductor 40 on the other side of magnet 30*a* (e.g., at the tip of elongated body 14) is left without power. In this case, elongated body 14 will illuminate from the first portion 18 to magnet 30*b*, i.e., material 38 proximate powered core conductor 36 and outer conductor 40 will activate and emit photons. When engageable element 16 magnetically couples to magnet 30*a* and 30*b*, engageable element 16 connects the outer conductor 40 in the tip with the remaining outer conductor 40, thereby further activating material 38 at the tip of the second portion 20. In one or more embodiments, the material 38 in the tip may be different such that light or photons are emitted at a different wavelength from the light emitted by material 38 positioned in first portions 18, and between first portion 18 and magnet 30*b*.

Figure 6:
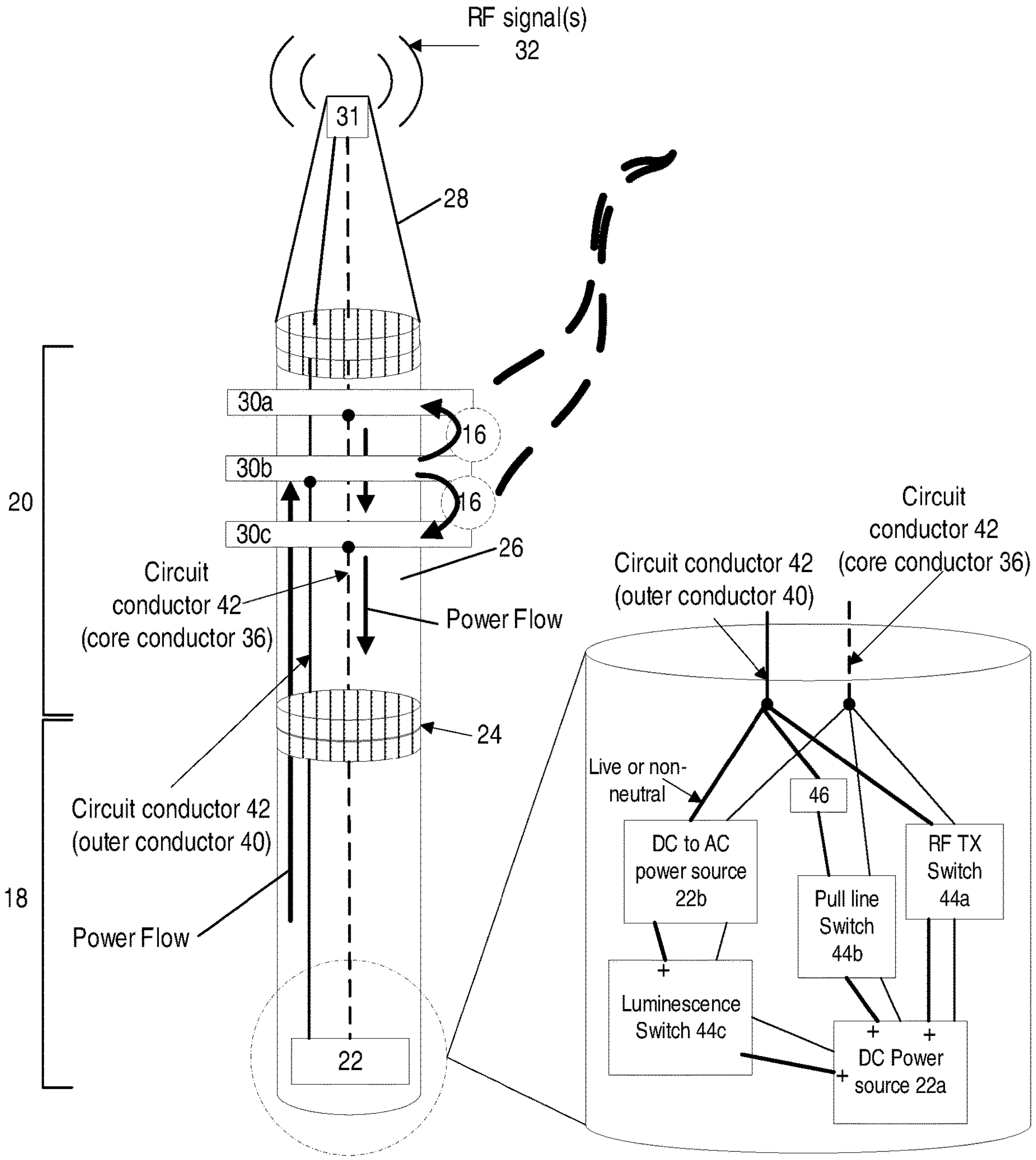
FIG. 6 is a diagram of another example of a portion of the elongated body and the pull line in the system of FIG. 1 according to some embodiments of the present disclosure.

FIG. 6 is a diagram of another example of first portion 18 and second portion 20 of elongated body 14 of FIG. 1 according to some embodiments of the present disclosure. In particular, magnet 30*b* is connected to outer conductor 40 while magnets 30*a* and 30*b* are connected to core conductor 36. Outer conductor 40 and core conductor 36 are electrically isolated from each other. Magnet 30*b* is positioned in between magnets 30*a* and 30*c* with magnet 30*b* being electrically isolated from magnets 30*a* and 30*c*. However, when engageable element 16 is removably attached to two magnets 30 (e.g., to 30*a* and 30*b*, or 30*b* and 30*c*), engageable element 16 will complete the circuit thereby electrically connecting two magnets 30 that would otherwise be electrically isolated from each other which, in turn, electrically connects outer conductor 40 to core conductor 36. Hence, in one or more embodiments, after engageable element 16 is removably attached as illustrated in FIG. 6, power will flow from power source 22 through at least two magnets 30 and engageable element 16, and then back to power source 22.

Further, FIG. 6 illustrates an exploded view of a portion of first portion 18. Power source 22 may comprise a direct current (DC) power source 22*a* and an alternating current (AC) power source 22*b*, which may convert DC power from the power source 22*a* to AC power. DC power source 22*a* may be in electrical communication with one or more switches 44*a*-44*c* (collectively referred to as switch 44), which are each switchable from an open position to a closed position to power one or more elements of elongated body 14. In a closed position, switch 44 provides an electrical path through the switch 44, while in an open position, switch 44 disconnects the electrical path through the switch 44. In one or more embodiments, indicator 46 is in electrical communication with pull line switch 44*b*. When power flows through pull line switch 44*b*, as described below, indicator 46 is configured to provide an indication to a user of system 10. In one or more embodiments, indicator 46 comprises at least one light emitting diode (LED). In one or more embodiments, indicator 46 may provide one or more of haptic, visual or audio feedback.

In one or more embodiments, two wires connect each switch 44 to DC power source 22*a*. For example, one wire may be connected to a positive terminal of DC power source 22*a* while another wire may be connected to a negative terminal of DC power source 22*a*. The wires that are capable and/or configured and/or arranged to provide an electrical path from the positive terminal are indicated by bolded lines. With respect to the DC to AC power source 22*b*, one wire provides an electrical path from the live or non-neutral terminal of the DC to AC power source 22*b* to outer conductor 40 while another wire provides an electrical path from the neutral terminal of the DC to AC power source 22*b* to core conductor 36. Further, other power configurations are equally applicable to one or more embodiments and/or examples described herein in accordance with the embodiments of the disclosure. For example, wiring the core conductor 36 to be in electrical communication with the positive terminal of DC power source 22*a* and wiring the outer conductor 40 to be in electrical communication with the negative terminal of DC power source 22*a*.

One or more switches 44 illustrated in FIG. 6 are equally applicable to at least one of the examples in FIG. 4 or FIG. 5 where the switches 44 provide an electrical path to one or more circuit conductors 42.

Figure 7:
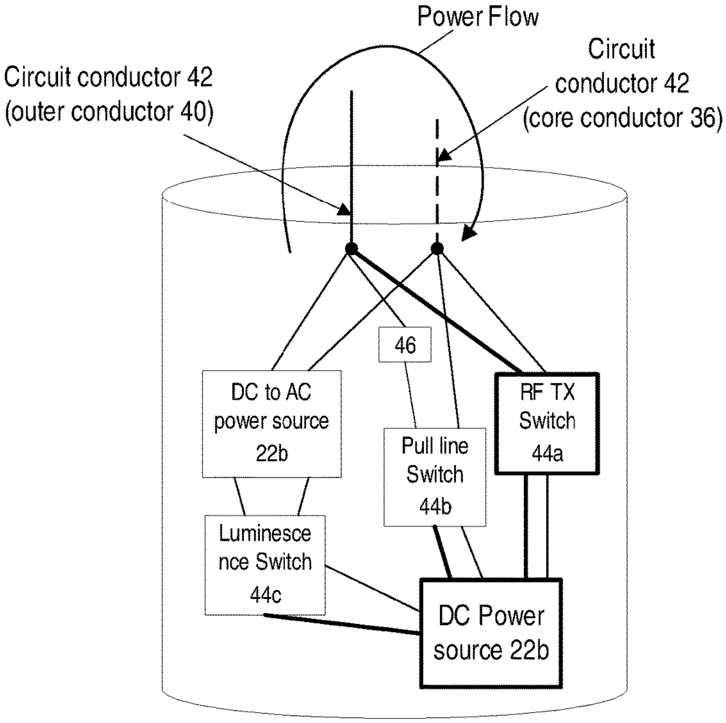
FIG. 7 is a diagram of an example configuration of the first portion of FIG. 6 according to some embodiments of the present disclosure.

FIG. 7 illustrates an example switch configuration of a portion of first portion 18 of FIG. 6 according to some embodiments of the present disclosure. In particular, RF TX switch 44*a* is in a closed position while pull line switch 44*b* and luminescence switch 44*c* are in an open position. DC power source 22*a* is in electrical communication with RF transmitter (TX) switch 44*a* where, in a closed position, RF TX switch 44*a* electrically connect DC power source 22*a* to outer conductor 40 and core conductor 36. In this example, a positive terminal of DC power source 22*a* may be connected to the outer conductor 40 and the negative terminal of the DC power source 22*a* may be connected to the core conductor 36, both connections occurring with the RF TX switch 44*a* switched into the closed position. Hence, in the example of FIG. 7, power will flow in an electrical path to RF TX switch 44*a* and then to outer conductor 40, thereby providing power to RF transmitter 31.

When RF TX switch 44*a* is in an open position, RF TX switch 44*a* acts as an open circuit or disconnects the electrical path through RF TX switch 44*a* such that outer conduct 40 and core conductor 36 are not connected to DC power source 22*a* via RF TX switch.

Figure 8:
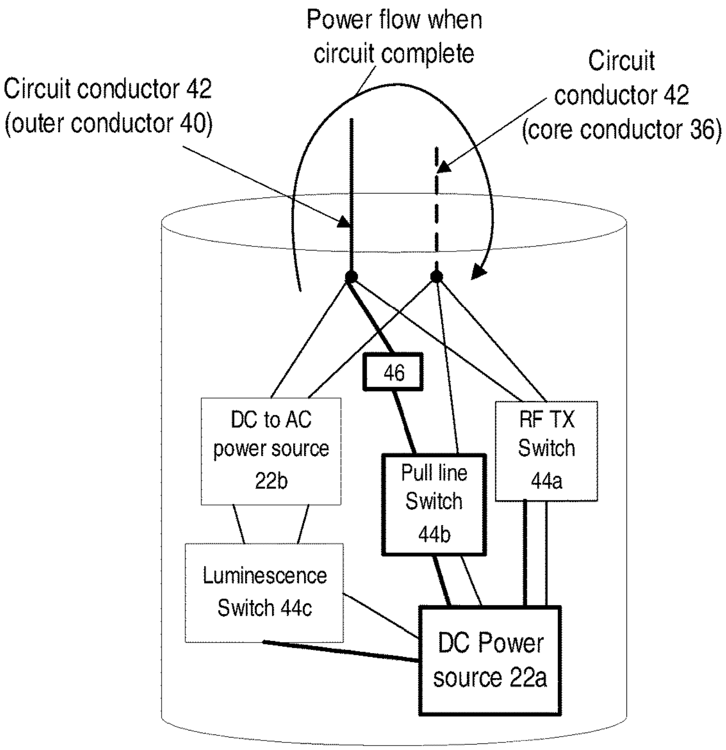
FIG. 8 is a diagram of another example configuration of the first portion of FIG. 6 according to some embodiments of the present disclosure.

FIG. 8 illustrates another example of a portion of first portion 18 of FIG. 6 according to some embodiments of the present disclosure. In the example of FIG. 8, pull line switch 44*b* RF is in a closed position while RF TX switch 44*a* and luminescence switch 44*c* are each in an open position. When pull line switch 44*b* is in a closed position, pull line switch 44*b* provides electrical paths from DC power source 22*a* to outer conductor 40 and core conductor 36. Further, when pull line switch 44*b* is in a closed position, power will not flow through outer conductor 40 and core conductor 36, via pull line switch 44*b*, due to an open or discontinuity in an electrical path that is created between at least two magnets 30 as described herein. Hence, once engageable element 16 is removably attached to at least two magnets 30, the electrical path or circuit will be completed, and power will flow through indicator 46 to indicate that engageable element 16 is removably attached to magnets 30, i.e., removably attached to retaining portion 26. In one or more embodiments, indicator 46 comprises an LED that is configured to activate when engageable element 16 is removably attached to magnets 30.

In one or more embodiments, indicator 46 comprises a plurality of LEDs. In one example, at least one LED indicates that pull line switch 44*b* is in a closed position while at least one other LED indicates engageable element 16 is removably attached to magnets 30. In one or more embodiments, elongated body 14 may be arranged with second portion 20 that does not include capture portion 28 such that pull line switch 44*b* will provide power material 38 and magnets 30. In one or more embodiments, material 38 is not activated by DC power flow through pull line switch 44*b* such that material 38 does not emit photons due to DC power flow. Alternatively, material 38 is configured to emit photons when DC power flows through pull line switch 44*b* such that material 38 acts as an indicator 46, e.g., a power ON indicator for pull line switch 44*b* and/or RF TX switch 44*a*. In one or more embodiments, material 38 is configured to emit a lower amount of photons when DC power flows through material 38 compared to when AC power flows through material 38.

Figure 9:
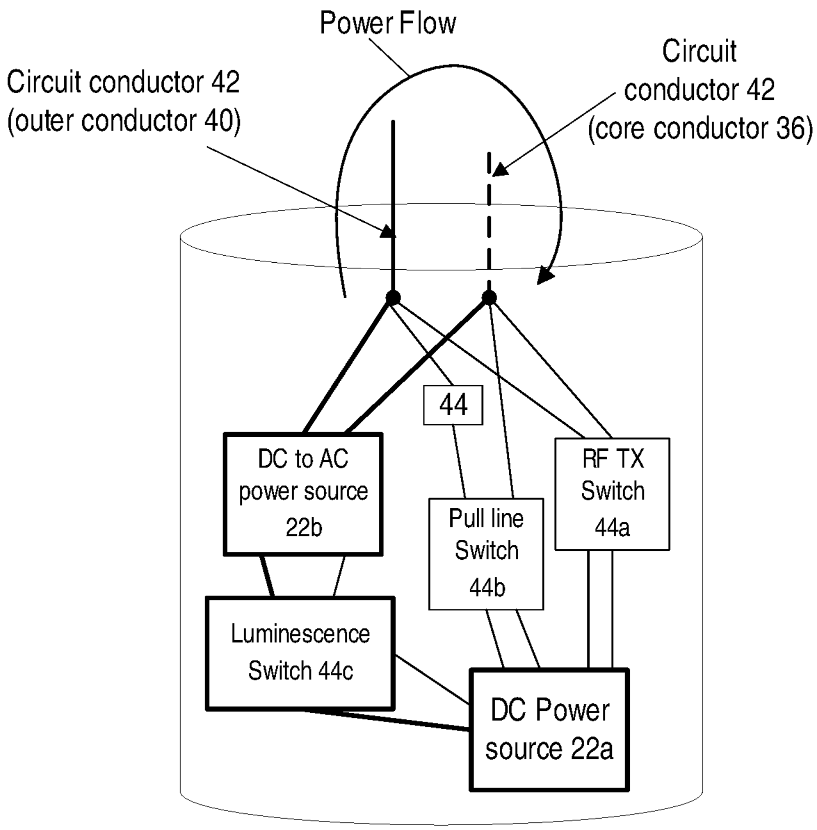
FIG. 9 is a diagram of another example configuration of the first portion of FIG. 6 according to some embodiments of the present disclosure.

FIG. 9 illustrates yet another example of a portion of first portion 18 of FIG. 6 according to some embodiments of the present disclosure. In the example of FIG. 9, luminescence switch 44*c* is in a closed while RF TX switch 44*a* and pull line switch 44*b* are each in a closed position. When luminescence switch 44*c* is in a closed position, luminescence switch 44*c* provides an electrical path from DC power source 22*a* to DC to AC power source 22*b*. When DC power is provided to DC to AC power source 22*b*, DC to AC power source 22*b* is configured to provide AC power to outer conductor 40 and/or core conductor 36, thereby, in some embodiments, electrically activating material 38 to emit photons. In one or more embodiments, luminescence switch 44*c* may be switched into a closed position when the magnet 30 based configuration of retaining portion 26 is not in use. Alternatively, the magnet 30 based configuration of retaining portion 26 is removably attached to first portion 18 when luminescence switch 44*c* is in a closed position, and the preconfigured electrical properties of magnets 30 and/or engageable element 16 will act as a load such that a short will not occur due to connecting outer conductor 40 and core conductor 36 via engageable element 16.

Figure 10:
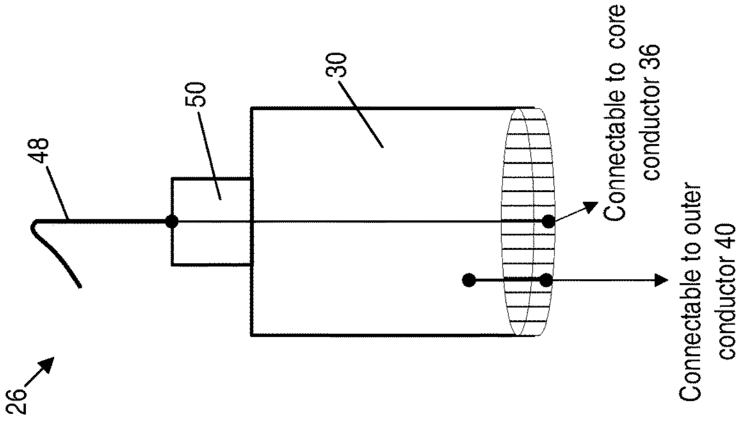
FIG. 10 is a diagram of an example configuration of the retaining portion of FIG. 1 according to some embodiments of the present disclosure.

FIG. 10 is a diagram of another example of retaining portion 26 of system 10 in FIG. 1 according some embodiments of the present disclosure. In this example, outer conductor 40 is in electrical communication with magnet 30 while core conductor 36 is in electrical communication with a hooking element 48 (e.g., type of capture component). Hooking element 48 is separated from magnet 30 by non-electrically conductive element 50. In one example, engageable element 16 will removably attach to magnet 30 while a portion of the pull line 12 is removably captured by hooking element 48 such pull line 12 will provide an electrical path from magnet 30 to hooking element 48, thereby providing power flow through outer conductor 40 and core conductor 36.

Figure 11:
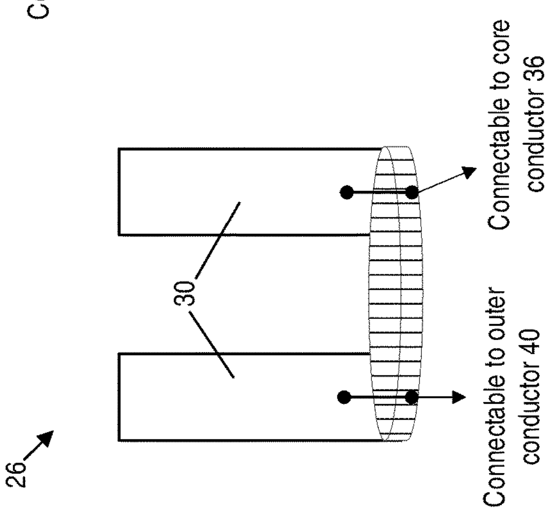
FIG. 11 is a diagram of another example configuration of the retaining portion of FIG. 1 according to some embodiments of the present disclosure.

FIG. 11 is a diagram of another example of retaining portion 26 of system 10 in FIG. 1 according some embodiments of the present disclosure. In the example of FIG. 11, one magnet 30 is connected to outer conductor 40 while another magnet 30 is connected to core conductor 36. When engageable element 16 is removably attached to one of the magnets 30, at least a portion of pull line 12 will removably attached to the other magnet, providing power flow through outer conductor 40 and core conductor 36. In another example, engageable element 16 is sized to physical contact both magnets when removably attached to both magnets 30 such that engageable element 16 provides an electrical path between magnets 30.

Figure 12:
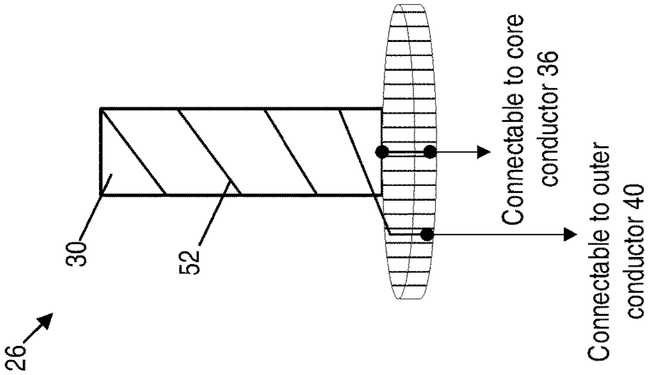
FIG. 12 is a diagram of another example configuration of the retaining portion of FIG. 1 according to some embodiments of the present disclosure.

FIG. 12 is a diagram of another example of retaining portion 26 of system 10 in FIG. 1 according some embodiments of the present disclosure. In the example of FIG. 12, magnet 30 is in electrical communication with core conductor 36 while outer conductor 40 is in electrically communication with wire 52 that is disposed along a portion of magnet 30 but that is electrically isolated from magnet 30. When engageable element 16 is removably attached to magnet 30, engageable element 16 and/or another portion of pull line 12 will provide a path from wire 52 to magnet 30, thereby provide an electrically path between outer conductor 40 and core conductor 36.

Figure 13:
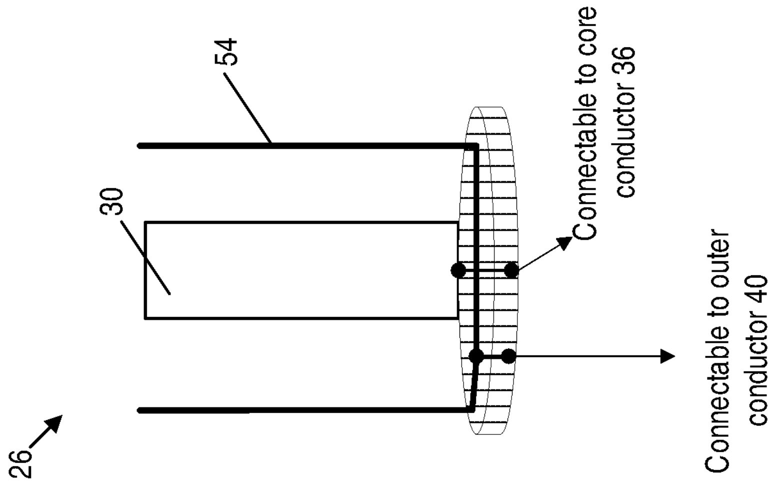
FIG. 13 is a diagram of another example configuration of the retaining portion of FIG. 1 according to some embodiments of the present disclosure.

FIG. 13 is a diagram of another example of retaining portion 26 of system 10 in FIG. 1 according some embodiments of the present disclosure. In the example of FIG. 13, magnet 30 is in electrical communication with core conductor 36 while wire element 54 is in electrical communication with outer conductor 40. Magnet 30 is electrically isolated from wire element 54. When engageable element 16 is removably attached to magnet 30 and in physical contact with wire element 54, engageable element 16 and/or another portion of pull line 12 will provide a path from wire element 54 to magnet 30, thereby provide an electrically path between outer conductor 40 and core conductor 36.

Figure 14:
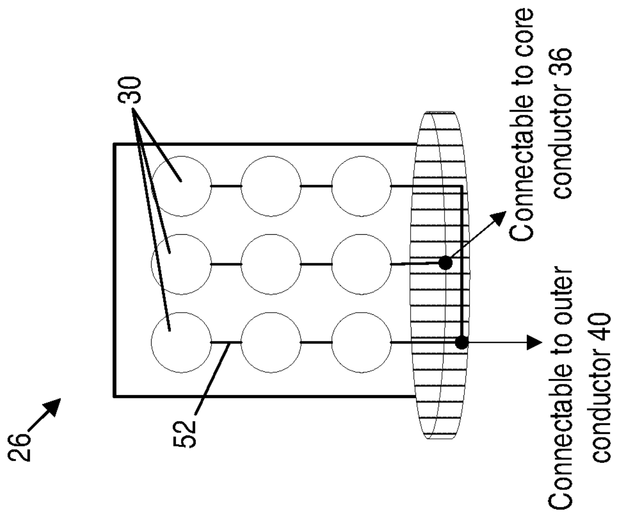
FIG. 14 is a diagram of another example configuration of the retaining portion of FIG. 1 according to some embodiments of the present disclosure.

FIG. 14 is a diagram of another example of retaining portion 26 of system 10 in FIG. 1 according some embodiments of the present disclosure. In the example of FIG. 14, two outer strings of magnets 30 are in electrical communication with outer conductor 40 while another string of magnets 30 (e.g., middle string of magnets 30) is in electrical communication with core conductor 36. Each string of magnets 30 may comprise at least two magnets that are in electrical communication with each other via one or more wires 52. When engageable element 16 is removably attached to one of the string of magnets 30, engageable element 16 and/or another portion of pull line 12 may also be removably attached to another string of magnets 30, thereby providing an electrical path from at least the middle string of magnets 30 to at least one other string of magnets 30, which provides an electrical path between outer conductor 40 and core conductor 36.

Figure 15:
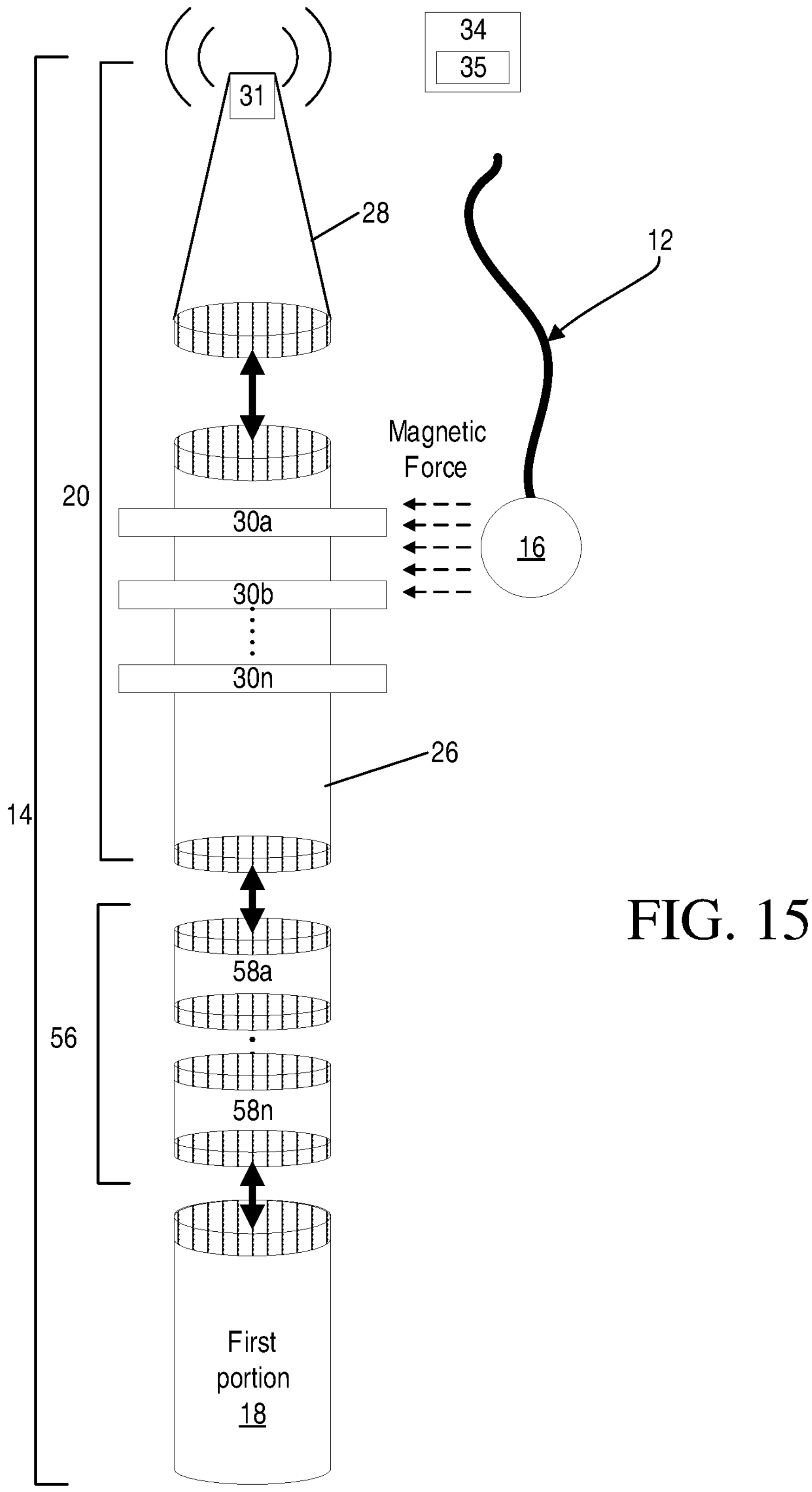
FIG. 15 is a diagram of an example of the elongated body in the system of FIG. 1 and various extending elements according to some embodiments of the present disclosure.

FIG. 15 is a diagram of another example of first portion 18 and second portion 20 of elongated body 14 of FIG. 1 with additional extending elements according to some embodiments of the present disclosure. System 10 may include an extending element 56 for extending a length of elongated body 14. Extending element 56 includes one or more extending elements 58*a*-58*n* (collectively and/or separately referred to as extending element 58). Each extending element 56 may correspond or substantially correspond to first portion 18 but without electrical power source 22. Alternatively, extending element 56 may correspond to second portion 20 but without magnets 30. Hence, extending element 56 may comprise core conductor 36, material 38 and outer conductor 40 as shown in FIGS. 2-6, and may also comprise one or more mating element 24 (as described herein) for removably connecting to one or more of first portion 18, second portion 20, other extending element(s) 56, etc.

Many different embodiments have been disclosed herein, in connection with the above description and the drawings. It would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

In addition, unless mention was made above to the contrary, the accompanying drawings are not to scale. A variety of modifications and variations are possible in light of the above teachings without departing from the scope and spirit of the present disclosure.

What is claimed is:

1. A system, comprising:

a pull line comprising an engageable element, the engageable element being removably attachable to an elongated body and electrically conductive;

the elongated body comprising:

an electroluminescent source disposed along at least a portion of the elongated body, the electroluminescent source comprising a core conductor, a first outer conductor and a second outer conductor, the first outer conductor and the second outer conductor being separated from the core conductor by a material, the electroluminescent source being configured to cause at least a portion of the material to emit photons when electrical power is applied between the core conductor and at least one of the first outer conductor and the second outer conductor;

a first portion comprising an electrical power source in electrical communication with the core conductor and the first outer conductor;

a second portion removably mateable at an end of the first portion, the second portion comprising:

a plurality of magnets disposed along the second portion, the plurality of magnets comprising:

a first subset of the plurality of magnets that are in electrical communication with each other and with the electrical power source via the first outer conductor;

a second subset of the plurality of magnets that are in electrical communication with each other via the second outer conductor, the second subset of the plurality of magnets not being in electrical communication with the first subset of the plurality of magnets via the first outer conductor;

at least one of the first subset of the plurality of magnets and at least one of the second subset of the plurality of magnets being removably attachable, by magnetic coupling, to the engageable element of the pull line to electrically connect, via the at least one of the first subset of the plurality of magnets and the first outer conductor, the second subset of the plurality of magnets and the second outer conductor to the electrical power source to activate portions of the electroluminescent source that are proximate the first and the second outer conductors;

at least one radio frequency (RF) transmitter in electrical communication with the electrical power source, the at least one RF transmitter configured to emit a plurality of frequencies, each of the plurality of frequencies configured to be detectable at a different distance from the at least one RF transmitter;

at least one RF detector comprising processing circuitry configured to:

detect a first frequency of the plurality of frequencies at a first distance from the RF transmitter, the remaining plurality of frequencies being undetectable;

trigger a first alert based on the detected first frequency, the first alert comprising at least one of haptic feedback, audible feedback or visual feedback;

detect a second frequency of the plurality of frequencies at a second distance from the RF transmitter, a third frequency of the plurality of frequencies remaining undetectable;

trigger a second alert based on the detected second frequency, the second alert comprising at least one of haptic feedback, audible feedback or visual feedback;

detect the third frequency of the plurality of frequencies at a third distance from the RF transmitter; and trigger a third alert based on the detected third frequency, the third alert comprising at least one of haptic feedback, audible feedback or visual feedback.

2. The system of claim 1, wherein a separation between a first magnet of the first subset of the plurality of magnets and a second magnet of the second subset of the plurality of magnets provides an electrical discontinuity in an electrical circuit comprising the first subset of the plurality of magnets, the first outer conductor, the second subset of the plurality of magnet, the second outer conductor and the electrical power source.

3. The system of claim 2, wherein the magnetic coupling of the end of the pull line to the first magnet and the second magnet completes the electrical circuit.

4. A system, comprising:

a pull line comprising an engageable element, the engageable element being magnetically removably attachable to an elongated body and electrically conductive;

the elongated body comprising:

an electroluminescent source disposed along the elongated body, the electroluminescent source comprising a core conductor, a first outer conductor and a second outer conductor, at least a portion of the electroluminescent source being configured to emit photons when electrical power is applied between the core conductor and at least one of the first outer conductor and the second outer conductor;

a first portion comprising at least one electrical power source in electrical communication with the core conductor and the first outer conductor;

a second portion removably mateable at an end of the first portion, the second portion comprising:

a plurality of magnets disposed along the second portion, the plurality of magnets comprising:

a first magnet that is in electrical communication with the at least one electrical power source via the first outer conductor;

a second magnet that is in electrical communication with the second outer conductor, the second magnet and the second outer conductor not being in electrical communication with the first magnet and first outer conductor;

the first magnet and the second magnet being removably attachable, by magnetic coupling, to the engageable element of the pull line to electrically couple, via the first magnet and first outer conductor, the second magnet and the second outer conductor to the at least one electrical power source to activate portions of the electroluminescent source that are proximate the first and the second outer conductors;

at least one radio frequency (RF) transmitter in electrical communication with the at least one electrical power source, the at least one RF transmitter configured to emit a plurality of frequencies, each of the plurality of frequencies configured to be detectable at a different distance from the at least one RF transmitter;

at least one RF detector comprising processing circuitry configured to:

detect the plurality of frequencies at the different distances from the RF transmitter for locating the RF transmitter; and trigger a respective alert for each of the detected frequencies of the plurality of frequencies.

5. The system of claim 4, wherein a separation between the first magnet and the second magnet provides an electrical discontinuity in an electrical circuit comprising the first magnet, first outer conductor, second magnet, second outer conductor and the at least one electrical power source.

6. The system of claim 5, wherein the magnetically coupling of the end of the pull line to the first magnet and the second magnet completes the electrical circuit.

7. The system of claim 4, wherein at least one of the core conductor, the first outer conductor or the second outer conductor is configured to provide the electrical communication between the at least one electrical power source and the RF transmitter.

8. The system of claim 4, wherein the an elongated body further comprises at least a third conductor disposed along a length of the elongated body, the at least third conductor being configured to provide electrical communication between the RF transmitter and the at least one electrical power source.

9. The system of claim 4, wherein the first portion comprises a first type of mating element positioned at the end of the first portion;

the second portion comprises a second type of mating element position at an end of the second portion; and when the first portion is removably mated to the second portion, the first type of mating element and the second type of mating element are configured to provide an electrical path among the core conductor, the first outer conductor and the second outer conductor of the second portion to the core conductor, the first outer conductor and the second outer conductor of the first portion.

10. The system of claim 9, wherein the system further comprises an extending element, the extending element being removably mateable with the first portion and the second portion of the elongated body, the extending element comprising:

an electroluminescent source disposed along the extending element, the electroluminescent source comprising a core conductor, a first outer conductor and a second outer conductor, at least a portion of the electroluminescent source being configured to emit photons when electrical power is applied between the core conductor and at least one of the first outer conductor and the second outer conductor;

the first type of mating element disposed at one end of the extending element; and the second type of mating element disposed at the other end of the extending element.

11. The system of claim 10, wherein:

when the extending element is mated with the first portion and the second portion of the elongated body, the first type of mating element and the second type of mating element of the extending element are configured to provide an electrical path among the core conductor, the first outer conductor and the second outer conductor of the second portion to the core conductor, the first outer conductor and the second outer conductor of the first portion.

12. The system of claim 10, wherein the first type of mating element is one of a female or male coaxial connector; and the second type of mating element is one of a male or female coaxial connector different from the first type of mating element.

13. The system of claim 4, wherein the respective alert for each of the detected frequencies of the plurality of frequencies comprises at least one of haptic feedback, audible feedback or visual feedback.

14. The system of claim 4, wherein at least a portion of each of the core conductor, the first conductor and the second conductor of the second portion is configured to extend from the second magnet in a direction opposite the first portion and first magnet.

15. The system of claim 4, wherein the second portion further comprises a capture component positioned at an end of the second portion, the capture component configured to removably capture at least a portion of the pull line.

16. The system of claim 15, wherein the capture component comprises a hook.

17. The system of claim 4, wherein the elongated body is a rod.

18. The system of claim 4, wherein the engageable element has one of a length, a width or a diameter greater than or equal to a distance between the first magnet and the second magnet.

19. The system of claim 18, wherein the engageable element is ring shaped.

20. The system of claim 4, wherein the at least a portion of the electroluminescent source that is configured to emit photons corresponds to a phosphor material disposed between the core conductor and the first and second outer conductors.

* * * * *